United States Patent Office.

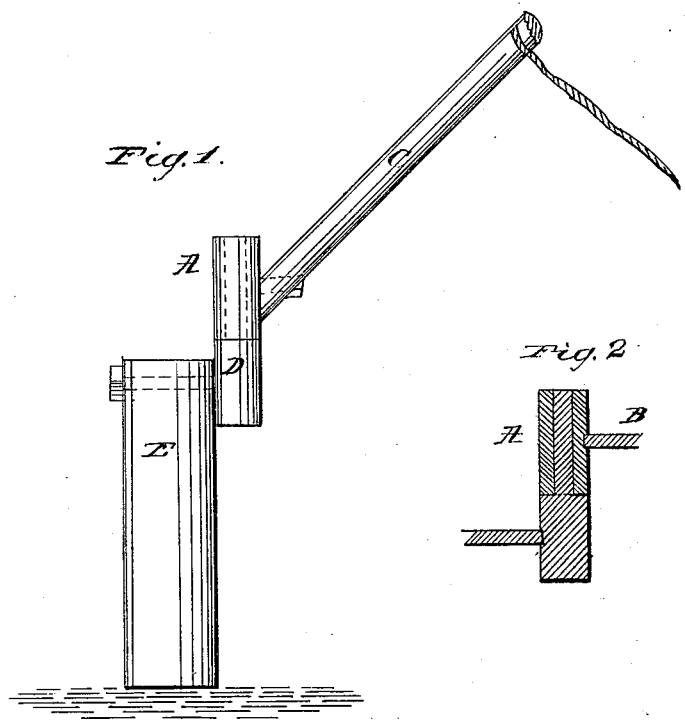

DANIEL NEWTON, OF SOUTHINGTON, CONNECTICUT.

Letters Patent No. 68,308, dated August 27, 1867.

IMPROVEMENT IN HITCHING-POSTS FOR ANIMALS.

The Schedule referred to in these Letters Patent and making part of the same.

TO ALL WHOM IT MAY CONCERN:

Be it known that I, DANIEL NEWTON, of Southington, in the county of Hartford, and State of Connecticut, have invented a new and useful Apparatus for a Hitching-Post for Grazing Animals; and I do hereby declare that the following is a full and exact description.

I take a piece of metal A, cast or wrought iron, about three inches long and one and a half in diameter. In the side of this piece I insert an arm, B, about two and a half inches long and one-half in diameter, with a nut on the end. This arm passes through the pole C, to which the animal is attached, which is secured in its place by the nut. The piece of metal A, to which the arm B is attached, may be hollow and revolve on a pin or solid D, with a pin turned on one end to turn in a socket. In either case the effect will be the same. The pole C should be so adjusted on the arm that it will hang at an angle of about forty-five degrees when left to itself.

The apparatus herein described being adjusted, and the animal attached to the pole with suitable length of rope, it can move in any direction, either horizontal or circular, from the post E to the limit allowed by the proportions of the apparatus, without the least possibility of entanglement in the rope.

What I claim as my invention, and desire to secure by Letters Patent, is—

The several parts shown at A, B, C, D, and E, when constructed and arranged as set forth.

DANIEL NEWTON.

Witnesses:
JOSHUA BILLS,
BENJAMIN HART.